United States Patent [19]

Ahlgren

[11] E Re. 31,206

[45] Reissued Apr. 12, 1983

[54] METHOD OF LOWERING AND RAISING LOADS BY MEANS OF A JACK ASSEMBLY AND LIFTING ELEMENT

[76] Inventor: Nils H. Ahlgren, 22 Skyttevägen, S-133 00 Saltsjöbaden, Sweden

[21] Appl. No.: 815,989

[22] Filed: Jul. 15, 1977

Related U.S. Patent Documents

Reissue of:

[64] Patent No.: 3,895,778
Issued: Jul. 22, 1975
Appl. No.: 321,154
Filed: Jan. 5, 1973

[30] Foreign Application Priority Data

Jan. 12, 1972 [SE] Sweden ..... 295/72

[51] Int. Cl.[3] ..... B66F 1/00
[52] U.S. Cl. ..... 254/1; 254/106
[58] Field of Search ..... 254/1, 105, 106, 107

[56] References Cited

U.S. PATENT DOCUMENTS

| | | | |
|---|---|---|---|
| 2,686,420 | 8/1954 | Youtz | 254/105 |
| 3,036,816 | 5/1962 | Stubbs et al. | 254/105 |
| 3,416,284 | 12/1968 | Adler | 254/106 |

FOREIGN PATENT DOCUMENTS

| | | | |
|---|---|---|---|
| 1961283 | 12/1970 | Fed. Rep. of Germany | 254/106 |

*Primary Examiner*—Robert C. Watson
*Attorney, Agent, or Firm*—Ira C. Edell; Donald E. Hewson

[57] ABSTRACT

In a method of lowering and raising loads by means of a jack assembly and lifting element the load is transferred from the lifting element by supporting means disposed on the lifting element and having a cross-section considerably larger than that of the lifting element. The supporting means are alternately carried by preferably dismountable carrying members with holes for the lifting element, which holes are smaller than the cross-section of the supporting means, the carrying members being mounted on relatively movable parts of the jack assembly.

11 Claims, 20 Drawing Figures

7
8
9
10
31
32
33
34
35
36
37

8
9
10
31
32
33
34
35

7
8
9
10
31
32
33
34
38
39
40
41
42
43

METHOD OF LOWERING AND RAISING LOADS BY MEANS OF A JACK ASSEMBLY AND LIFTING ELEMENT

Matter enclosed in heavy brackets [ ] appears in the original patent but forms no part of this reissue specification; matter printed in italics indicates the additions made by reissue.

In lowering loads by means of an operating cylinder hydraulic jack assembly and lifting element the hydraulic jack assembly is wholly or partly relieved of load by part of the pressure medium in the operating cylinder being led to a lateral chamber communicating with the jack assembly. In the next working cycle the same amount of pressure medium is returned from the lateral chamber to the operating cylinder of the jack assembly.

In lowering rigid loads by means of a plurality of hydraulic jack assemblies and pertaining lifting elements the hydraulic systems of the different jack assemblies are interconnected so that a uniform distribution and lowering, respectively, of the load is realized.

This invention relates to a method of lowering and raising a load by means of a jack assembly and lifting element in which the load is transferred from the lifting element by supporting means movable along said element and having a cross-section considerably larger than that of the lifting element.

According to the invention the supporting means are alternately carried by preferably dismountable carrying members with holes for the lifting element, which holes are smaller than the cross-section of the supporting means, said carrying members being mounted on relatively movable parts of the jack assembly. The invention permits the use of a simple equipment in lowering and raising loads and simultaneously makes it possible to perform the lowering and raising operation with the utmost safety.

The invention also relates to a method of lowering loads by means of an operating cylinder hydraulic jack assembly and lifting element. In this method the hydraulic jack assembly is wholly or partly relieved of load by part of the pressure medium in the operating cylinder being led to a lateral chamber communicating with the jack assembly, and the same amount of pressure medium is returned from the lateral chamber to the operating cylinder of the jack assembly in the next operating cycle.

The present invention further relates to a method of lowering rigid loads by means of a plurality of hydraulic jack assemblies and pertaining lifting elements, wherein the hydraulic systems of the different jack assemblies are interconnected so that a uniform distribution and lowering, respectively, of the load is realized.

The invention will be more fully described hereinbelow with reference to the accompanying drawings illustrating the methods according to the invention as well as some jack assemblies to which the invention is applicable. In the drawings.

Figure 1:
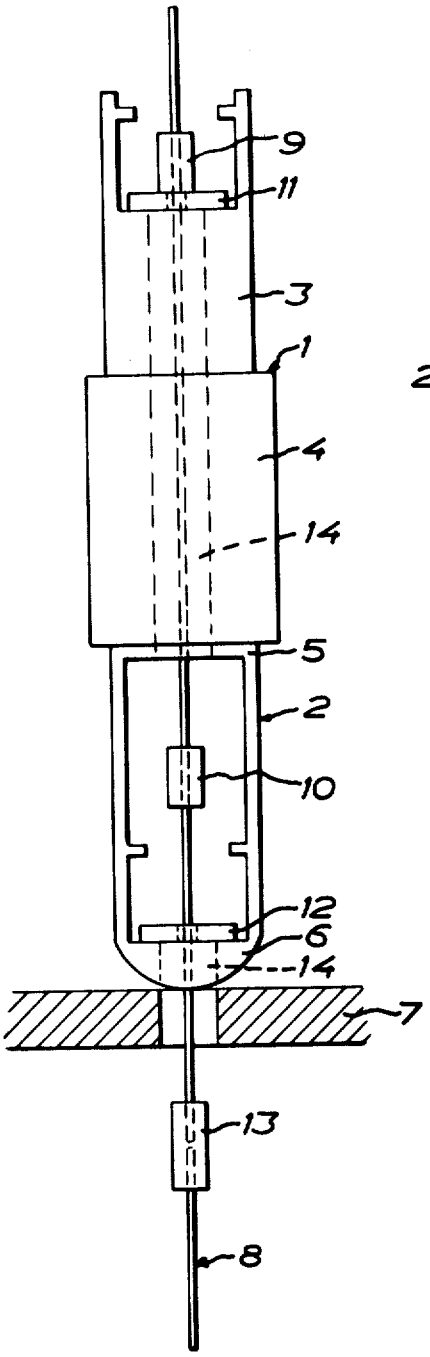
FIG. 1 is a side view of one of the jack assemblies cooperating with a lifting element.

The jack assembly illustrated in FIG. 1 comprises a jack 1 and spacing means 2. The jack 1 which is preferably hydraulic is composed of a piston unit 3 and a cylinder unit 4 which serves as a fixed part. The spacing means 2 has its upper end portion 5 connected to the fixed part 4 of the jack 1 while it rests with its lower end portion 6 against a fixed base 7.

The load is applied to a lifting element which is in the form of a lifting rod 8. The load is to be transferred from said rod by supporting means 9 and 10 shiftable along the rod and having a cross-section considerably larger than that of the lifting rod 8. The supporting means 9 and 10 are adapted to be alternately carried by dismountable carrying members 11 and 12 which are formed with holes for the lifting rod 8, said holes being smaller than the cross-section of the supporting means 9 and 10. The carrying member 11 is adapted to co-operate with the piston unit 3 while the carrying member 12 is adapted to co-operate with the spacing means 2 at or in proximity to the lower end portion 6 thereof.

For instance upon raising of the load, the lifting rod 8 takes part in the upward movement of the piston unit because the supporting means 9 rests against the carrying member 11. When the piston unit 3 reaches its top position the supporting means 10 is moved into engagement with the carrying member 12 whereupon the piston unit 3 is allowed to return to its bottom position. Then the supporting means 9 is again brought into engagement with the carrying member 11 by being shifted along the rod 8 to effect continued raising of the load.

The rod 8 preferably has a thread of large pitch, and upon rotation the supporting means 9 and 10 are movable in the manner of nuts along the rod 8. The supporting means 9 and 10 may be connected to springs or like means which are activated when the supporting means 9 and 10 are moved relative to the carrying members 11 and 12 and which move the supporting means 9 and 10 along the lifting rod 8 when they are relieved of load.

The lifting rod 8 is adapted to be joined to other rod lengths by means of joining pieces 13 of larger cross-section than that of the lifting rod 8. The jack 1 and the spacing means 2 must therefore be provided with wide passages 14 for the lifting rod 8. Besides, it must be possible to dismount the carrying members 11 and 12 alternately so as to allow free passage of the lifting rod joining pieces 13.

As will appear from the drawings the piston unit 3 and the spacing means 2 are provided with upper and lower positions for the carrying members 11 and 12, the choice of position being determined by the point at which the joining piece 13 is situated so that the joining piece 13 does not disturb the raising or lowering movement.

In the embodiment illustrated the spacing means 2 is adapted to rest on the fixed base 7, the lower end portion 6 being rounded in such a way as to permit angular changes in relation to the base 7. In another embodiment the spacing means 2 may be adapted to rest on the fixed part 4 of the jack 1 with its lower end portion 6, in which case the carrying member 12 co-operates with the upper end portion 5. Between said end portions 5 and 6 the spacing means 2 in any circumstances is so shaped as to permit the requisite shifting of the carrying member 12.

Figure 2:
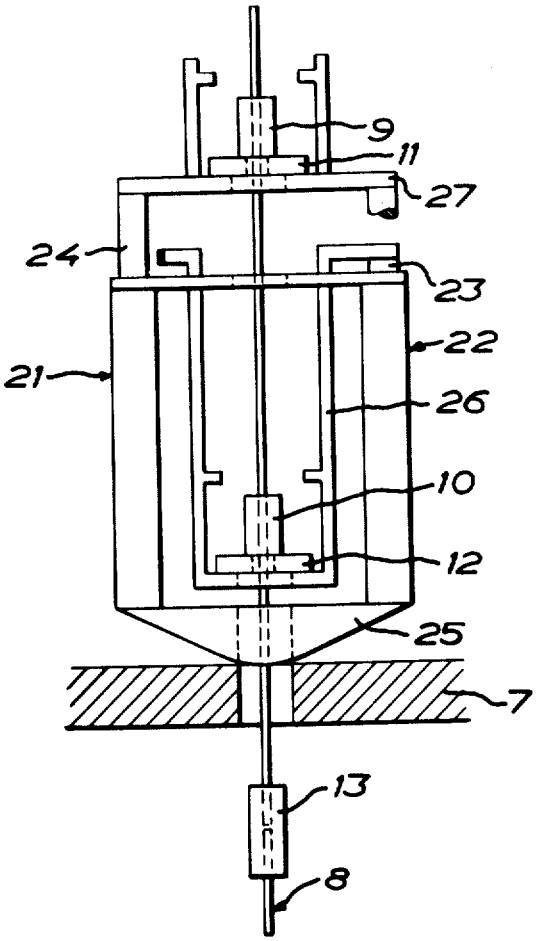
FIG. 2 is a side view of another of the jack assemblies co-operating with a lifting element.
Figure 3:
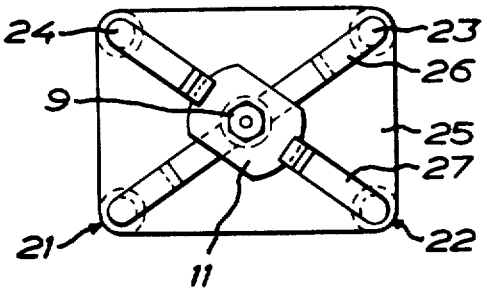
FIG. 3 is a plan view of the jack assembly in FIG. 2.

The jack assembly shown in FIGS. 2 and 3 comprises two co-operating hydraulic jacks 21 and 22. The relatively movable parts of the jack assembly, on which parts the carrying members are mounted, comprise the piston units 23 and 24 in the jacks 21 and 22. As shown in FIGS. 4 and 5 the jacks 21 and 22 could be disposed upon one another. In the embodiment shown in FIGS. 2 and 3 the jacks 21 and 22 are juxtaposed so that a compact structure is obtained. Each jack 21 and 22, respectively, includes two cylinder and piston units which are diagonally disposed at the corners of a rectangular supporting plate 25. The pistons 23 of one jack 21 are connected to a U-shaped member 26 whereof the web facing the supporting plate 25 serves as a base for the carrying member 12. The pistons 24 of the other jack 22 are connected to a member 27 extending directly between them and serving as a base for the carrying member 11. The bases for the carrying members 11 and 12 thus are at different levels although the jacks 21 and 22 are fully juxtaposed. Same as in the embodiment shown in FIG. 1 the bases for the carrying members 11 and 12 are divided into upper and lower positions, the choice of position being determined by the place at which the joining piece 13 is situated.

In a preferred embodiment the bases of the carrying members 11 and 12 consist of units which individually co-operate with the rod 8 and to which the main parts of the jacks are intended for detachable connection, from the side of the rod 8. The parts of the jack assembly should thus be provided with laterally open grooves permitting the parts to be moved into and out of position of engagement with the rod 8. By this arrangement the rod 8, when no raising or lowering movement is effected, can be carried by a simple supporting means resting on the base 7.

FIGS. 4a–4e illustrate how the load applied to the rod 8 is lowered with the use of two hydraulic jacks 31 and 32 which are arranged above one another but which could be juxtaposed as shown in FIGS. 2 and 3. The supporting means momentarily carried by the jacks has been shown fully hatched. With the load distributed uniformly on the two supporting means, said means are partly hatched.

The jacks 31 and 32 are formed with at least one lateral chamber 35. The engagement pressure of the jack 31 and 32, respectively, against the supporting means 9 and 10, respectively, is wholly or partly removed when the hydraulic medium is transferred to the lateral chamber 35. In the preferred embodiment illustrated the lateral chamber is common to the two hydraulic jacks 31 and 32 which have been interconnected so as to form a closed system. The hydraulic jack assembly thus forms a closed system with the lateral chamber 35 in which the hydraulic medium is subjected to a low pressure. In the drawings the pressure is produced by the spring 36 which actuates a piston in the chamber 35 which is a cylinder. The chamber 35 in another embodiment thereof may have resilient walls which serve to produce the desired pressure. The pressure can also be produced by means of a hand pump.

Figures 4A, 4B, 4C, 4D, 4E:
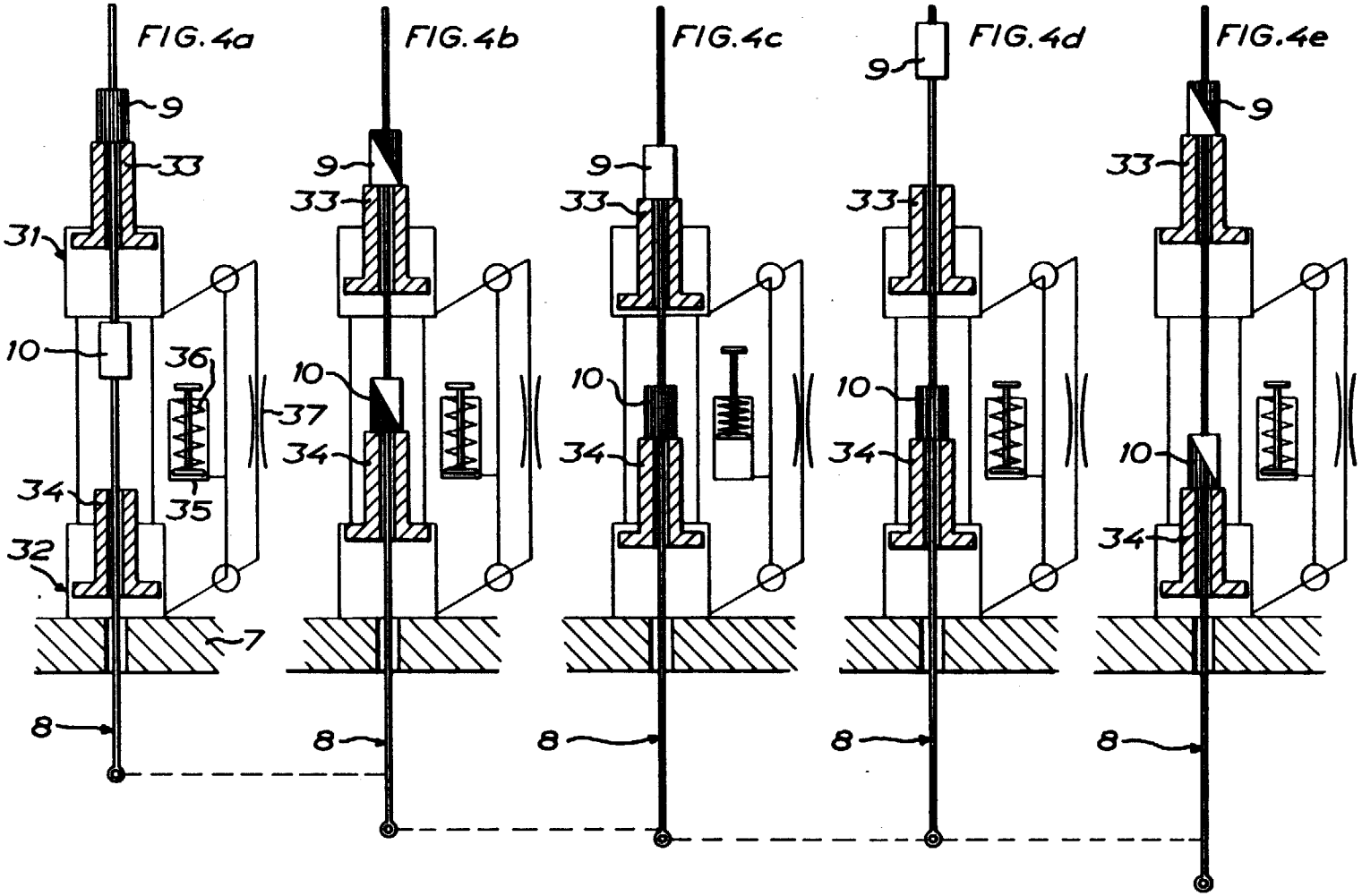
FIGS. 4a–4e are views illustrating step by step the lowering of a load by means of a jack assembly comprising two hydraulic jacks.

In FIG. 4a the full load is carried by the piston 33 of the jack 31 which is shut off from the remaining system. The supporting means 10 has been moved along the rod 8 away from the piston 34 of the jack 32 which is in communication with the lateral chamber 35. Because the supporting means 10 does not rest against the piston 34 any longer the latter has been raised somewhat from its lower end position. This is due to the fact that the medium in the chamber 35 has been returned to the jack 32 by the spring 36. The pressure in the chamber 35 thus is capable of lifting the proper weight of the piston 34.

In FIG. 4a the jack assembly is ready for lowering of the load by means of the upper piston 33. In FIG. 4b the cylinders of the two jacks 31 and 32 have been connected via the throttle valve 37, the load on the pistons 33 and 34 having finally been distributed uniformly according to the law of communicating vessels. In FIG. 4c the upper supporting means 9 is relieved of load without giving up its engagement with the piston 33. Besides the communication between the jacks 31 and 32 is interrupted simultaneously as the chamber 35 is connected to the jack 31. The load has now been taken over by the piston 34 simultaneously as the piston 33 is relieved of load by the medium in the jack 31 being transferred to the lateral chamber 35.

In FIG. 4d the supporting means 9 has been moved along the rod 8 and the piston 33 has been raised somewhat by the medium in the chamber 35. FIG. 4d thus corresponds to FIG. 4a with the difference, however, that lowering shall be effected by the lower piston 34, the cylinders of the two jacks 31 and 32 being again connected with one another via the throttle valve 37, as shown in FIG. 4e.

Figures 5A, 5B, 5C, 5D, 5E, 5F, 5G:
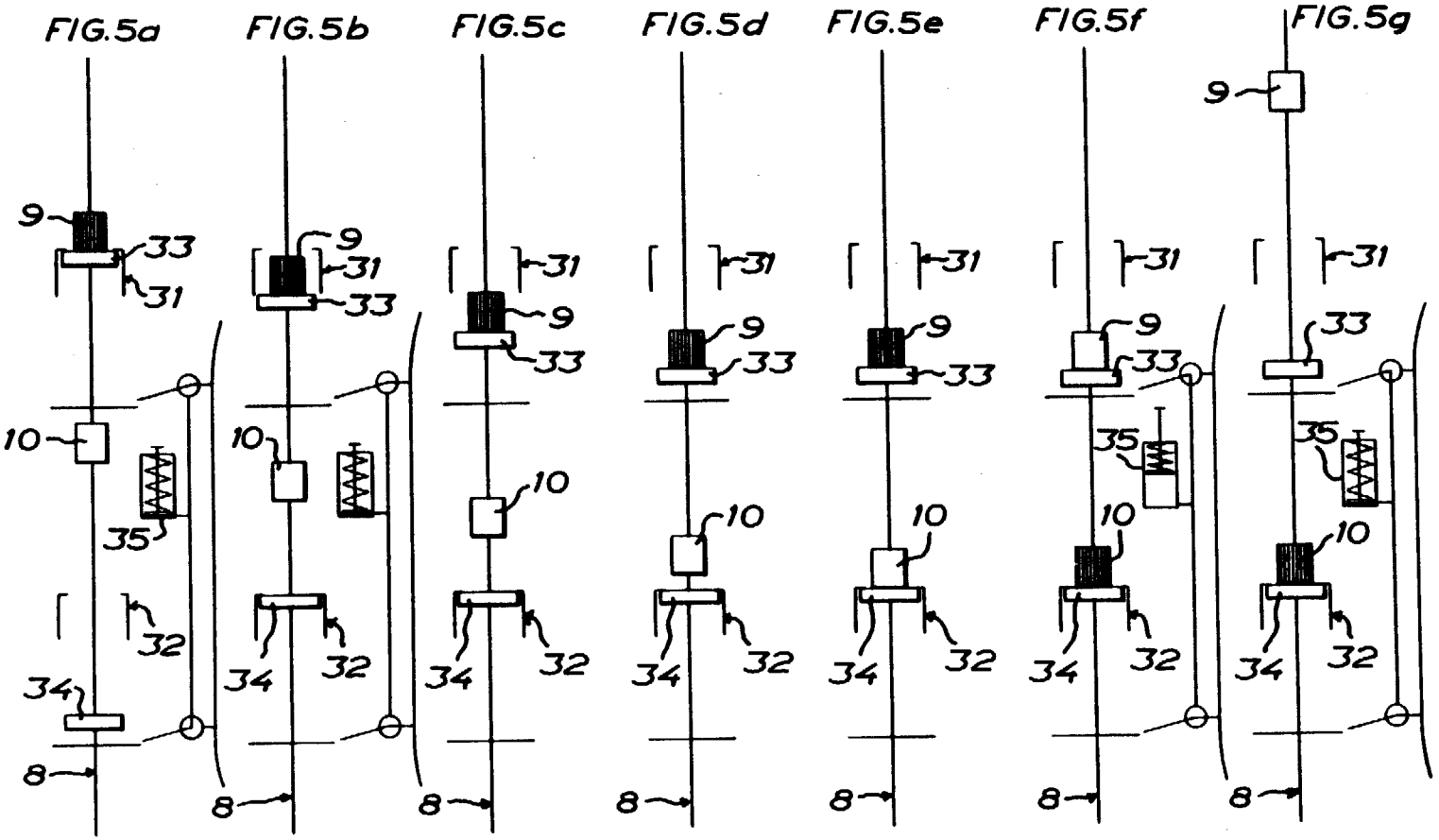
FIGS. 5a–5g are diagrammatic views illustrating step by step the lowering of a load by means of a plurality of interconnected hydraulic jack assemblies.

In FIGS. 5a–5g use is made of a plurality of jack assemblies 31 and 32 with pertaining lifting rods 8 for the lowering of a rigid load, the closed systems of the different jack assemblies 31, 32 being interconnected so that a uniform lowering of the load in all rods 8 is realized. The jack assembly diagrammatically shown in FIGS. 5a–5g are of the same nature as that illustrated in FIGS. 4a–4e, and in the illustrated embodiment the jack assembly is assumed to be one of a group of three interconnected jack assemblies. In FIG. 5a this assembly occupies the same position as in FIG. 4a. In FIG. 5b the jack 32 has been connected to the system of the three interconnected jack assemblies, all three rods 8 having been lowered a third of the stroke length at the same time as the piston 34 in the assembly in question has reached its top position. FIG. 5c shows the position of the jack assembly in question after the second of the three jack assemblies of the group has been connected to the common system, which implies that all three lifting rods 8 have been lowered a further third of the stroke length. In FIG. 5d the third of the jack assemblies in the group has been connected to the common system, which implies that all three lifting rods 8 have again been lowered a third of the stroke length. After the lowering movement thus completed the supporting means 10 is moved downwards into engagement with the piston 34, as shown in FIG. 5e. The jack 31 is then connected to the lateral chamber 35 so that the full load is transferred to the supporting means 10, as shown in FIG. 5f. In FIG. 5g the supporting means 9 has been moved along the rod 8 away from the piston 33 in the jack 31 and the piston 33 has been raised somewhat by the medium in the chamber 35. FIG. 5g thus corresponds to FIG. 5a with the difference, however, that lowering shall now be effected with the lower piston 34.

In the embodiment according to FIGS. 6a–6e the return cylinders of the two cylinder and piston units consist of the lateral chamber with which the two jacks 31 and 32 are in communication. To attain the desired communication the jack assembly has a multi-way valve 38. Besides, it appears from FIGS. 6a–6e that the supporting means 9 and 10 need not necessarily be rigid means movable along the lifting element, but they can be for instance gripping means formed as supporting means.

Figures 6A, 6B, 6C, 6D, 6E:
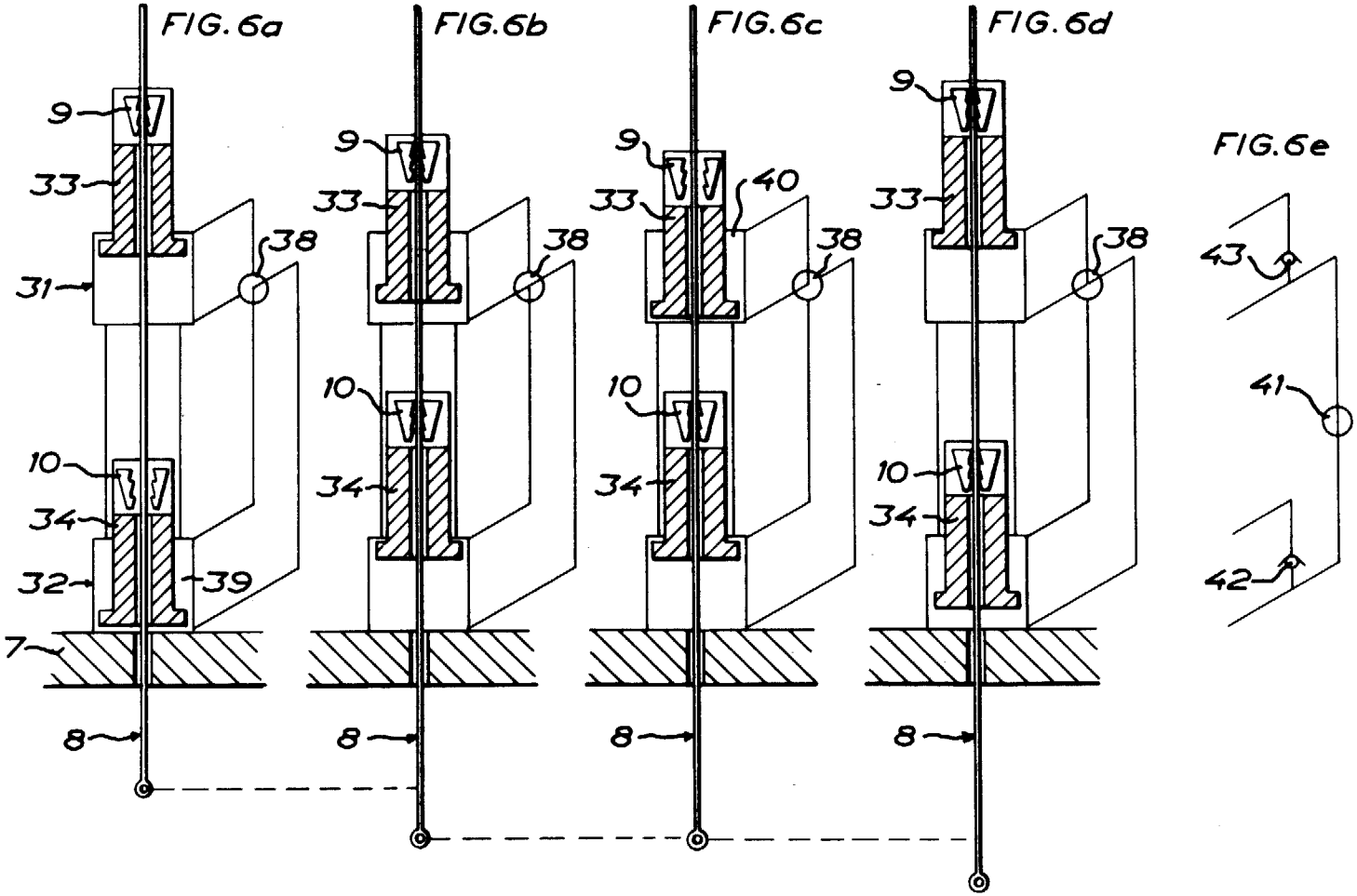
FIGS. 6a–6e are views illustrating step by step the lowering method of the invention with the use of a modified embodiment of the jack assembly shown in FIG. 4.

In FIG. 6a the jack assembly is ready for lowering of the load with the aid of the upper piston 33. In FIG. 6b the main cylinders of the two jacks 31 and 32 have been interconnected by means of the multi-way valve 38 while the communication with the return cylinder 39 of the lower jack 32 is maintained. Before the lower piston 34 has reached its top position its gripping means 10 has been closed so that the load is distributed on the two pistons 33 and 34. In FIG. 6c the upper piston 33 is relieved of load in that the oil in its main cylinder is transferred via the valve 38 to the return cylinder 40 where a certain vacuum has been provided during the lowering movement of the piston 33. The gripping means 9 can then be opened or the carrying member can be removed. The jack assembly is now ready for lowering of the load by means of the lower piston 34.

In FIG. 6d the main cylinders of the two pistons 33 and 34 are again connected by means of the multi-way valve 38 while the communication with the return cylinder 40 of the upper piston 33 is maintained so that the oil in said return cylinder 40 can be returned to the main cylinder system at the return movement of the upper piston 33. By the return of this oil amount to the main cylinder system the upper piston 33 reaches its top position before the lower piston 34 has reached its bottom position so that there is the possibility of relieving the lower piston 34 of load by allowing the remaining oil in the main cylinder thereof to flow into its return cylinder 39 where a certain vacuum has now been provided.

FIG. 6e shows an alternative conduit diagram wherein the multi-way valve 38 has been replaced by a simple shut-off valve 41 and wherein the connections with the return cylinders 39 and 40 extend via the non-return valves 42 and 43. This arrangement implies the advantage that the return cylinder will not be erroneously exposed to pressure above atmospheric at the return movement of the piston.

I claim:

1. A method of lowering and raising a load by means of a jack assembly and lifting element, which comprises transferring the load from the lifting element by supporting means moveable along said lifting element and alternately carrying the supporting means by one-and-then the other of two carrying means having holes accommodating the passage of the lifting element, with said carrying means being mounted on [relatively moveable] parts of the jack assembly *which are moveable relative to each other*, and said lifting element being joined in series with other lengths of lifting element by connectors of a size incapable of passing through the holes of the carrying means *and of a length substantially less than that of any one length of lifting element*, and alternately dismounting the [carrier] *carrying* means to permit free passage of the connectors *upwards and downwards* and thus *to permit free passage of* the joined lengths of the lifting element.

*2. A method of lowering and raising a load by means of a jack assembly and lifting element, which comprises transferring the load from the lifting element by supporting means moveable along said lifting element and alternatively carrying the supporting means by one-and-then the other of two carrying means having holes accommodating the passage of the lifting element, with said carrying means being mounted on parts of the jack assembly which are moveable relative to each other, and said lifting element being joined in series with other lengths of lifting element by connectors of a size incapable of passing through the holes of the carrying means and of a length substantially less than that of any one length of lifting element, and alternately dismounting said carrying means to permit free passage of said connectors upwards and downwards.*

*3. The method of claim 2, wherein the carrying means are mounted on relatively movable parts of the jack assembly in optional upper or lower positions, the choice of position being determined by the place where the joining pieces are situated.*

*4. The method of claim 3, wherein the relatively movable parts of the jack assembly on which parts the carrying means are mounted consist of a piston unit of the jack and of a spacing means co-operating with a fixed part of said jack.*

*5. The method of claim 3, wherein the relatively movable parts of the jack assembly on which parts the carrying means are mounted, are piston units of at least two co-operating jacks.*

*6. A method of lowering and raising a load by means of a lifting element and a jack assembly having load bearings parts; said method comprising the steps of:*

*(a) transferring the support for a load carried by said lifting element from a first to a second supporting means which are movable along said lifting element and which may be fixed with respect to said lifting element at different positions therealong, carrying said first supporting means by a first carrying means to effect movement of the load, and thereafter carrying said second supporting means by a second carrying means to support the load so that said first carrying means and supporting means are free of load and may be moved relative to said lifting element; both said carrying means being provided with holes accommodating the passage of said lifting element therethrough and being removably mounted on said load bearing parts of said jack assembly; and*

*(b) physically removing and remounting the carrying means which is free of load while the other of said carrying means is carrying its respective supporting means, to permit free passage of said supporting means upwards and downwards with respect to said lifting element.*

*7. The method of claim 6 where said lifting element is joined in series with other lengths of lifting elements, by connectors of larger cross-section than that of said lifting elements; said load bearing parts of said jack assembly being provided with apertures to permit the passage of said connectors and supporting means therethrough.*

*8. The method of claim 6 where said lifting element is substantially centrally located in said jack assembly.*

*9. The method of claim 6 wherein said first carrying means is mounted above said second carrying means, the arrangement being such that said connectors do not interfere with the removing and remounting of said carrying means which is free of load when lowering and raising a load.*

*10. The method of claim 6 wherein said load bearing parts of said jack assembly on which said first and second carrying means are mounted consist of a piston unit of said jack assembly and a spacing means in fixed engagement with a fixed portion of said jack assembly so that said piston unit is movable with respect to said spacing means.*

*11. The method of claim 6 wherein said load bearing parts of said jack assembly on which said first and second carrying means are mounted are piston units of at least two co-operating jack assemblies.*

* * * * *